United States Patent
Metzen

(10) Patent No.: US 12,456,284 B2
(45) Date of Patent: Oct. 28, 2025

(54) DEVICE AND METHOD FOR CLASSIFYING IMAGES AND ACCESSING THE ROBUSTNESS OF THE CLASSIFICATION

(71) Applicant: Robert Bosch GmbH, Stuttgart (DE)

(72) Inventor: Jan Hendrik Metzen, Boeblingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 342 days.

(21) Appl. No.: 17/996,827

(22) PCT Filed: Sep. 13, 2021

(86) PCT No.: PCT/EP2021/075029
§ 371 (c)(1),
(2) Date: Oct. 21, 2022

(87) PCT Pub. No.: WO2022/058256
PCT Pub. Date: Mar. 24, 2022

(65) Prior Publication Data
US 2023/0206601 A1    Jun. 29, 2023

(30) Foreign Application Priority Data
Sep. 15, 2020   (EP) .................................. 20196113

(51) Int. Cl.
*G06V 10/764*    (2022.01)
*G06V 10/82*    (2022.01)

(52) U.S. Cl.
CPC ............ *G06V 10/764* (2022.01); *G06V 10/82* (2022.01); *G06V 2201/04* (2022.01)

(58) Field of Classification Search
CPC .. G06V 10/764; G06V 10/82; G06V 2201/04; G06V 20/56; G06V 20/58; G06V 40/113; G06F 18/2413; G06N 3/0464
See application file for complete search history.

(56) References Cited

U.S. PATENT DOCUMENTS 10,817,740 B2 * 10/2020 Tariq ..................... G06V 20/56

FOREIGN PATENT DOCUMENTS

| EP | 3588382 A1 * | 1/2020 | ........... A61B 5/7267 |
| EP | 3690760 A1 | 8/2020 | |
| JP | 2011200584 A | 10/2011 | |
| WO | 2020012872 A1 | 1/2020 | |
| WO | 2020099957 A1 | 5/2020 | |

OTHER PUBLICATIONS

Modas, et al.: "Towards Robust Sensing for Autonomous Vehicles: An adversarial perspective," IEEE Signla Processing Magazine, the U.S., IEEE 37(2020), arXiv:2007.10115v1, pp. 1-9.

(Continued)

*Primary Examiner* — Carol W Chan
(74) *Attorney, Agent, or Firm* — NORTON ROSE FULBRIGHT US LLP

(57) ABSTRACT

A computer-implemented method for determining an output signal characterizing a first classification of an input image into a class from a plurality of classes. The output signal further characterizes a second classification of a robustness of the first classification against an attack with an adversarial patch.

14 Claims, 6 Drawing Sheets

(56) References Cited

OTHER PUBLICATIONS

International Search Report for PCT/EP2021/075029, Issued Dec. 8, 2021.
Brendel et al., "Approximating CNNS With Bag-of-Local-Features Models Works Surprisingly Well on Imagenet," Cornell University, 2019, pp. 1-15. <https://arxiv.org/pdf/1904.00760.pdf> Downloaded Oct. 19, 2022.
Levine et al., "(De)Randomized Smoothing for Certifiable Defense Against Patch Attacks," Cornell University, 2020, pp. 1-14.
Xiang et al., "Patchguard: Provable Defense Against Adversarial Patches Using Masks on Small Receptive Fields," Cornell University, 2020, pp. 1-18.
Zhang et al., "Clipped Bagnet: Defending Against Sticker Attacks With Clipped Bag-of-Features," 2020 Symposium on Security and Privacy Workshops (SPW), 2020, pp. 55-61.
Keren et al., "Analysis of Loss Functions for Fast Single-Class Classification," Knowledge and Information Systems, vol. 62, 2020, pp. 337-358.
Zimmer et al., "Technical Report: Supervised Training of Convolutional Spiking Neural Networks With Pytorch," Cornell University, 2019, pp. 1-24.

\* cited by examiner

DEVICE AND METHOD FOR CLASSIFYING IMAGES AND ACCESSING THE ROBUSTNESS OF THE CLASSIFICATION

FIELD

The present invention relates to a method for classifying an image, a method for operating an actuator, a computer program, a machine-readable storage medium, a classifier, and a training system.

BACKGROUND INFORMATION

Wieland Brendel and Matthias Bethge: "*Approximating CNNs with Bag-of-local-Features models works surprisingly well on ImageNet*," arXiv, 20 Mar. 2019, https://arxiv.org/abs/1904.00760v1 describes an image classifier for classifying images based on image patches.

SUMMARY

Classifiers are prone to misclassifying maliciously altered input data known as adversarial examples. In a special form, an adversarial example may be datum that was altered in a constraint area of the datum to form the adversarial example. For example, a certain area of an image may be overlaid with another and smaller image such that it fools an image classifier, which would otherwise classify the image correctly.

Creating adversarial examples this way is known as using a threat model of an adversarial patch or patch-based adversarial examples. Adversarial patches are highly relevant for many real-world devices employing a classifier.

For example, an image classifier may be used to identify the locations of pedestrians in the surrounding environment of an at least partially autonomous vehicle in order to compute a safe path for the vehicle through the environment without hitting any of the pedestrians. In this example, adversarial patches could be applied to either part of the environment or at least one the pedestrians themselves in order to have the image classifier miss at least one pedestrian. This can lead to the vehicle determining a path through the misdetected pedestrian, which in turn can lead to an unsafe behavior of the vehicle.

Hence, there exists a desire for securing a classifier against adversarial patches.

An advantage of the method with features the present invention is that in addition to classifying an image, the method also indicates, whether the classification result is provably robust against being altered by an adversarial patch. This increases the classification performance, as it can be clearly and reliably indicated if a classification might not be secure to the extent that it can be trusted with respect to an adversarial patch. In turn, this information can be used to, e.g., control a device which uses the method for classifying the device's surrounding area. For example, if a non-robust classification is detected, operation of the device may be paused or handed over to a human operator.

SUMMARY

In a first aspect, the present invention concerns a computer-implemented method for determining an output signal characterizing a first classification of an input image into a class from a plurality of classes. According to an example embodiment of the present invention, the output signal further characterizes a second classification of a robustness of the first classification against an attack with an adversarial patch, wherein determining the output signal comprises the steps of:

Determining a plurality of first score maps, wherein a first score map corresponds to a class from the plurality of classes and comprises a plurality of area classifications, wherein each area classification characterizes for an area of a plurality of areas of the image whether the area belongs to the class or not;

Determining a plurality of first class scores, wherein each first class score from the plurality of first class scores corresponds to a class from the plurality of classes and is determined by aggregating the area classifications of the first score map corresponding to the class that characterize a classification into the class;

Determining a second class score, wherein the second class score is a minimum class score that can be obtained if an adversarial patch is applied to the input image for changing the area classification of the first score map corresponding to a first class that corresponds to the largest first class score;

Determining a plurality of third class scores, wherein a third class score corresponds to a class different from the first class and is a maximum class score that can be obtained if the adversarial patch is applied to the input image for changing the area classifications of the first score map of the class;

If the second class score is larger than all third class scores, determine the output signal such that it characterizes a first classification of the input image based on the plurality of first class scores and that it characterizes a second classification of the first classification as robust against the adversarial patch;

If the second class score is smaller than at least one third class score, determine the output signal such that it characterizes a first classification of the input image based on the plurality of first class scores and that it characterizes a second classification of the first classification as not robust against the adversarial patch.

The input image may, for example, be determined from a sensor, e.g., a camera sensor, a LIDAR sensor, a radar sensor, an ultrasonic sensor or a thermal camera. It can also be imagined, that the input image is the result of applying a pre-processing step to another image, e.g., by cropping and/or scaling and/or rotating and/or color correcting the other image. An input image may also be the result of a computer simulation, e.g., by rendering a virtual environment into the image. The input image may be digitally drawn. The input image may be a combination of multiple images, e.g., images from multiple different sensors.

The method may preferably be carried out by an image classifier, which is configured to receive images of a predefined type and provide the output signal based on all the steps of the method.

According to an example embodiment of the present invention, the input image may be overlaid with an adversarial patch. Adversarial patches may be of the form of a physical adversarial patch, i.e., a patch that is applied to the real world from which the input image is recorded. This can, for example, be achieved by applying a sticker to objects. Alternatively, the input image may be overlaid with an adversarial patch after it has been recorded. This can, for example, be achieved if an attacker has access to a sensing device responsible for sensing the input image and may manipulate the input image after it has been sensed by the sensing device.

In the context of the present invention, an adversarial patch may be understood as intending to flip the area classifications of a score map corresponding to a correctly classified class of the input image, wherein flipping may be understood as changing the area classifications of the score map with respect to what the area classifications would have been if the adversarial patch was not applied to the image. The goal of an attacker using an adversarial patch is to flip the area classifications of the score map of the class which is desired to be predicted for the input image such that the aggregated class score for the score map is lower than another aggregated class score and the image is hence misclassified.

Preferably, according to an example embodiment of the present invention, the each score map from the plurality of first score maps is determined by a convolutional neural network. This is advantageous as convolutional neural networks are currently the highest performing image classifiers. As a score map can be understood as a collection of classifications, using a convolutional neural network for determining the score maps hence allows for obtaining the score maps with highest accuracy.

A score map may be understood as assigning area classifications for a plurality of areas to the image, wherein the score map corresponds to a class and each classification either indicates an area belonging to a class or the area not belonging to the class. Preferably, the score map is given by a matrix of a predefined height and width. Each element of the matrix may be understood as an area classification.

If a score map is determined from a convolutional neural network, each element of the matrix obtained from the convolutional neural network, i.e., each area classification, relates to a certain area of the input image. This area is also known as the receptive field of the respective element of the matrix. The area is a preferably small subpart of the input image. The size of the receptive field can be controlled by the architecture of the convolutional neural network.

A score map can be aggregated into a single class score, wherein the class score can be understood as an unnormalized probability for the class corresponding to the score map.

A score map depends on the input image. It can be envisioned as a plurality of classification scores for a plurality of areas an adversarial patch can be applied to.

According to an example embodiment of the present invention, aggregating a score map may be achieved by determining the sum of area classifications in the score map that characterize a classification of the class the score map corresponds with. Alternatively, aggregating the score map may be achieved by a neural network, wherein the neural network is configured to accept the score map as input and provide a class score as output and wherein the neural network only comprises positive weights and non-decreasing activation functions.

For both aggregation methods, an advantage is that the mathematical function underlying the aggregation is non-decreasing. The function being non-decreasing can be understood as follows: Imagine the area classifications in a score map are given as 1 for classifications indicating to belong to the class corresponding to the score map and as 0 for classifications indicating to not to belong to the class, then an aggregation function may be understood as non-decreasing if it holds that if $M_{i,j}^{(1)} \geq M_{i,j}^{(2)}$ then $g(M^{(1)}) \geq g(M^{(2)})$, wherein $M_{i,j}^{(1)}$ is an area classification at position i,j of the score map $M^{(1)}$, $M_{i,j}^{(2)}$ is an area classification at position i,j of the score map $M^{(2)}$ and $g(\cdot)$ is the function.

The inventors surprisingly found that if this condition holds, i.e., the aggregation function is non-decreasing, than a score map of a class corresponding to the highest class score of the plurality of first class scores cannot be flipped such that a class score obtained from aggregating the flipped score map is lower than a class score obtained from aggregating any other flipped score map for the input image corresponding to a class score which is lower than the highest class score if the following condition holds:

$$g(M^{c_t}(X^p)) > g(M^c(X^p)) \forall c \neq c_t \text{ and } \forall X^p,$$

wherein $M^{c_t}(X^p)$ is a score map obtained for a class $c_t$ corresponding to the largest score, wherein the score map's area classifications have been flipped according to an image $X^p$ with an adversarial patch inserted at position p, $M^c(X^p)$ is a score map obtained for a class c wherein the score map's area classifications have been flipped according to the image $X^p$ with the adversarial patch inserted at position p.

This may be understood as determining how much the largest first class score can be decreased by an adversarial patch while increasing the other first class scores. If it is not possible to decrease the largest first class score below a maximum increase of another first class score, the adversarial patch cannot change the classification characterized by the output signal.

This condition can be evaluated without determining explicitly generating new score maps for each possible position of the adversarial patch: Each score map relates to an area of the image. If an adversarial patch is placed at a certain position, the worst it can do is flip all area classifications of the score map corresponding to the largest first class score such that they characterize the classification of not belonging to the class of the score map, if the area classification is dependent on the adversarial patch. For example, if an adversarial patch extends into an area of the input image, the adversarial patch may flip the area classification of the score map for the area. However, the adversarial patch can only flip the area classification that correspond to areas which are actually overlaid by the adversarial patch.

According to an example embodiment of the present invention if for aggregating score maps the sum of a score map is used, in the step of determining the second class score, the second class score may be determined by subtracting a maximum amount if area classifications the adversarial patch can change from the largest first class score.

In this case, according to an example embodiment of the present invention, in the step of determining the plurality of third class scores, a third class score may be determined by adding a maximum amount of area classifications the adversarial patch can change to a first class score.

An advantage of this approach is that not all possible positions of the adversarial patch have to be computed explicitly. Much rather, this approach determines an absolute amount of area classifications that an adversarial patch can change and determines whether changing this amount could potentially yield a change in classification. This approach requires considerably less computations as the score maps do not need to be adapted but the result can be obtained from the first class scores directly. In practice, this results in classifying more images in a given amount of time using the same amount of resources, i.e., energy.

If for aggregating score maps the neural network is used, according to an example embodiment of the present invention, the method for determining the output signal may further comprise training the neural network, wherein training the neural network is achieved by adversarial training.

For example, given a fixed convolutional neural network for determining first score maps from the input image, the neural network for aggregation can be trained comprising the steps of:
Determining a training image;
Overlaying the training image with an adversarial patch at a randomly determined position;
Determining a plurality of first score maps for the input image;
Aggregating the score maps by means of the neural network into a plurality of class scores;
Determining a loss value characterizing a difference between the determined class scores and a plurality of desired class scores;
Determining a gradient of the loss value with respect to a plurality of parameters of the neural network;
Updating the parameters of the neural network based on the gradient.

As loss function, a margin loss $$l = \max_{c \neq c_t} \max(0, \hat{y}_c + m - \hat{y}_{c_t}),$$

may be used, wherein $\hat{y}_c$ is the c-th class score of the determined plurality of class scores, m is a value characterizing a predefined margin and $\hat{y}_{c_t}$ is the first class score for a desired class of the training image.

The plurality of parameters of the neural network may include at least parts of the weights of the neural network and/or at least parts of the biases of the neural network and/or normalizing parameters, e.g., as used in a normalization layer.

According to an example embodiment of the present invention, in the step of determining the second class score, determining the second class score comprises the steps of:
Determining a plurality of second score maps for the class corresponding to the largest first class score, wherein for each possible position of an adversarial patch in the input image a second score map is determined, wherein for each second score map an area classification is determined to not characterize the class if the adversarial patch extends into the area corresponding to the area classification;
Aggregate each second score map to determine a plurality of intermediate class scores;
Providing the smallest intermediate class score from the plurality of intermediate class scores as second class score.

It can be further imagined that in the step of determining the plurality of third class scores, determining a third class score comprises the steps of:
Determining a plurality of second score maps for the class corresponding to the third class score, wherein for each possible position of an adversarial patch in the input image a second score map is determined, wherein for each second score map an area classification is determined to characterize the class if the adversarial patch extends into the area corresponding to the area classification;
Aggregate each second score map to determine a plurality of intermediate class scores;
Providing the largest intermediate class score from the plurality of intermediate class scores as second class score.

An advantage of this approach is that the actual amount of area classifications that can be flipped is determined. This way, a tighter bound for determining the robustness of the classification can be determined, i.e., the first classification may be classified as robust even if the difference between the largest first class score and all other first class scores is smaller than twice the maximum amount of area classifications the adversarial patch can flip.

It can be further imagined that the plurality of first score maps and/or the plurality of second score maps is determined by a convolutional neural network.

The advantage of using a convolutional neural network is that convolutional neural networks are currently the image classifiers with the highest accuracy for classifying images. As obtaining the plurality of first score maps and/or the plurality of second score maps can be understood as an image classification, using a convolutional neural network for this task allows for the highest classification accuracy.

Preferably, the convolutional neural network determines a first score map by determining an output of an output layer of the convolutional neural network for the input image (x) and applying a Heaviside function to the output.

Preferably, the method further comprises training the convolutional neural network, wherein training comprises the steps of:
Determining a plurality of first score maps for a training image by providing the image to the convolutional neural network;
Determining a plurality of first class scores by aggregating each first score map from the previously determined plurality of score maps;
Determining a loss value $$l = \max_{c \neq c_t} \max(0, \hat{y}_c + m - \hat{y}_{c_t}),$$

wherein $\hat{y}_c$ is the c-th class score of the plurality of first class scores, m is a value characterizing a predefined margin and $\hat{y}_{c_t}$ is the first class score for a desired class of the training image $(x_i)$;
Determining a gradient for a plurality of parameters of the convolutional neural network using backpropagation, wherein if the convolutional neural network comprises a Heaviside function, the gradient of the Heaviside function is replaced by the gradient of a Sigmoid function;
Adapting the parameters of the convolutional neural network according to the gradient.

The plurality of parameters of the convolutional neural network may include at least parts of the weights of the neural network and/or at least parts of the biases of the neural network and/or normalizing parameters, e.g., as used in a batch norm layer.

Training the convolutional neural network this way can be understood as the convolutional neural network learning to predict score maps which, when aggregated, have the largest possible margin between a largest first class score and a second largest first class score. It is hence advantageously learning to become robust against attacks with an adversarial patch.

The margin may be chosen according to a largest amount of area classifications that can be flipped by an adversarial patch. This way, the convolutional neural network does not need to increase a largest first class score once it has passed a value that would make it impossible for an adversarial patch to flip it anyways. This advantageously eases the learning problem and allows for a faster training time. Given the same amount of resources, i.e., the same amount of training time, the proposed approach hence increases the performance as the convolutional neural network can be trained with more images.

Example embodiments of the present invention will be discussed with reference to the figures in more detail.

DETAILED DESCRIPTION OF EXAMPLE EMBODIMENTS

Figure 1:
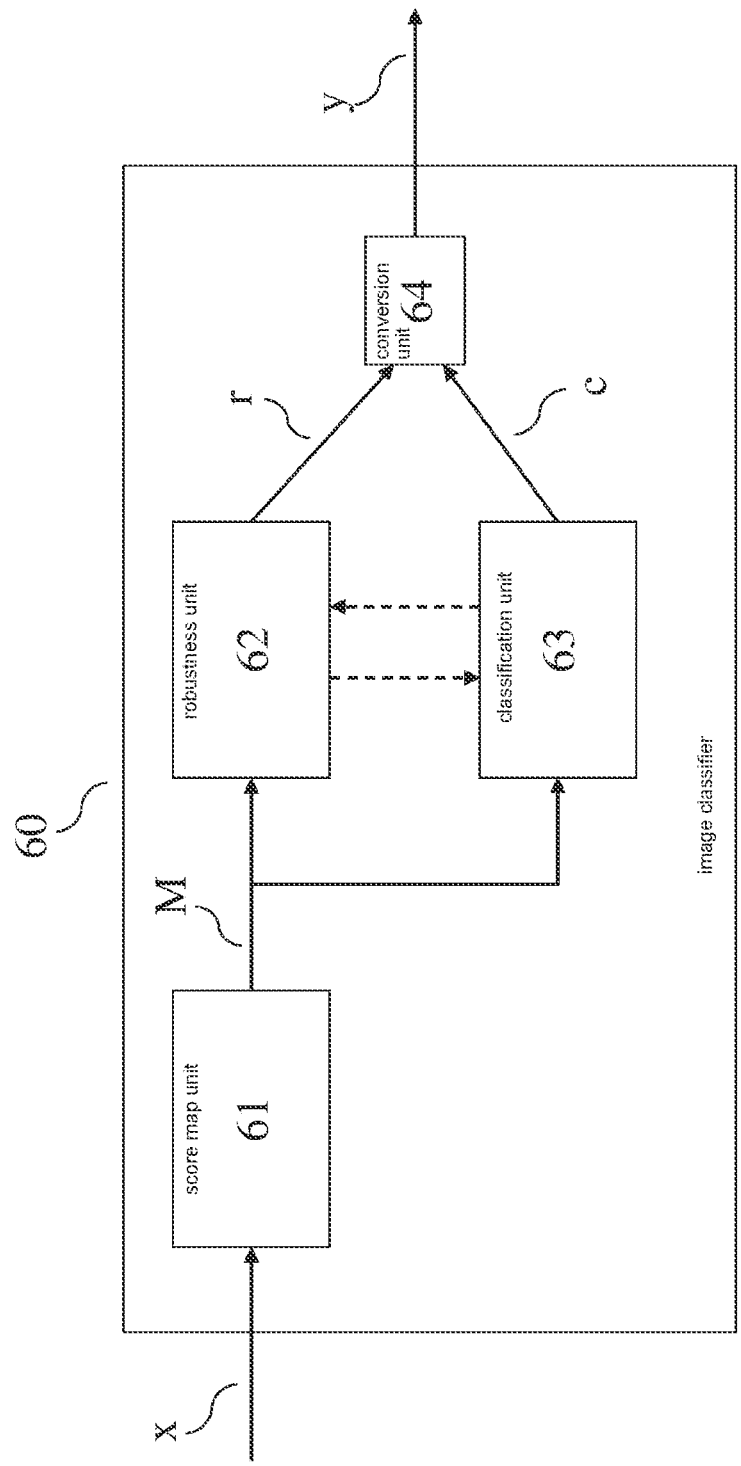
FIG. 1 an image classifier, according to an example embodiment of the present invention.

Shown in FIG. 1 is an embodiment of an image classifier (60) for determining a first classification (c) of an input image (x) and a second classification (r) characterizing a robustness of the first classification (c).

The image classifier (60) receives the input image (x) in a score map unit (61). The score map unit (61) is configured to determine a plurality of score maps (M) from the input image (x). Preferably, the score map unit (61) comprises a convolutional neural network, which takes the input image (x) as input and provides the plurality of score maps (M). For this, the neural network may be configured to provide a tensor representing the plurality of score maps (M), wherein the tensor is of a predefined height, width and depth. Each matrix of the tensor along the depth dimension may represent a score map of the plurality of score maps, wherein each dimension corresponds to a specific class. In other words, each matrix along the depth dimension of the tensor may represent the score map for a specific class. The tensor (M) comprises area classifications (i.e., the elements of the tensor (M)), which may be 0 or 1. A 0 may indicate that an area classification characterizes an area as not belonging to the class corresponding to the score map the area classification belongs to. Likewise, a 1 may indicate that an area classification characterizes an area as belonging to the class corresponding to the score map the area classification belongs to. In other words, the tensor (M) may be a tensor of zeros and ones. In further embodiments, this dichotomous classification may also be expressed by two other values, e.g., as binary variables (true or false). In even further embodiments, the tensor (M) may also comprise values in the interval from (and including) 0 to 1, e.g., probability values. Preferably, the receptive field of the output layer of the convolutional neural network that provides the tensor covers a small area of the input image (x). For example, the convolutional neural network may be chosen such that the final layer has a receptive field of 9-by-9, 17-by-17 or 33-by-33 pixels in the input image (x).

Preferably, the convolutional neural network comprises a Heaviside function as activation function in the output layer providing the tensor of score maps (M). This way, the tensor (M) comprises only zeros and ones. In further embodiments, it can be imagined that a different activation or no activation is used in the output layer and that the result of the output layer is then compared against a predefined threshold to determine the tensor or score maps (M).

The tensor (M) is then forwarded to a classification unit (63), which aggregates the score maps of the tensor (M). In the embodiment, the classification unit (63) performs the aggregation by summing the elements of each matrix along the depth of the tensor, i.e., by determining the sum of each score map in the tensor (M). The result is a plurality of first class scores (c). The first class scores (c) may be understood as characterizing a first classification of the input image (x). In further embodiments, instead of summing the score maps, a second convolutional neural network may be used, which takes the tensor (M) as input and provides the plurality of first class scores (c). In these further embodiments, the second convolutional neural network is configured to resemble a non-decreasing function. That means, that the second convolutional neural network only employs non-decreasing functions as activation functions and comprises only positive weights.

The tensor (M) is also forwarded to a robustness unit (62). The robustness unit (62) is configured to determine, whether the classification characterized by the first class scores (c) can be altered if an adversarial patch is applied to the input image (x) or not. Here, applying an adversarial patch to the input image (x) may be understood as either changing the input image (x) directly by overlaying it with the adversarial patch. Alternatively, applying an adversarial patch to the input image (x) may also be understood as applying the adversarial patch to the scene the input image (x) is being sensed from.

The robustness unit (62) takes the tensor (M) as input and provides a robustness classification (r) of the plurality of first class scores (c). For this, the robustness unit determines a maximum amount of area classifications the adversarial patch can change. In the embodiment, this is achieved by determining the amount of area classifications of a score map the adversarial patch can change. As each area classifications depend only on an area of the input image (x), the adversarial patch can only change the area classification if it extends into the area or covers the area. The maximum amount of area classification of a score map the adversarial patch can change is hence equal to an amount of areas the adversarial patch can cover or extend into in the input image (x). Having obtained the amount, the robustness unit (62) determines a second classification (r), wherein the second classification (r) classifies the first classification as robust if the largest first class score from the plurality of first class scores (c) is larger than or equal to the sum of the second largest first class score from the plurality of first class scores (c) and twice the maximum amount. If the largest first class score from the plurality of first class scores (c) is smaller than the sum of the second largest first class score from the plurality of first class scores (c) and twice the maximum amount, the second classification (r) is determined to characterize the first classification as non-robust.

The plurality of first class scores (c) and the robustness classification (r) may then be provided as an output signal (y) of the image classifier (60). In further embodiments, an optional conversion unit (64) of the image classifier (60) may process the first class scores (c) and/or the robustness classification (r) and output the result as output signal (y).

For example, it can be imagined that instead of the plurality of class scores (c), a class corresponding to the largest class score is provided in the output signal (y) along with the robustness classification (r). Alternatively, the conversion unit may provide the plurality of first class scores (c) or the class as output signal (y) if the robustness classification (r) characterizes a robust classification. In this case, the robustness classification (r) characterizes a non-robust classification, the output signal (y) may be set to characterize no definitive classification result. This may, for example, be in the form of setting the output signal (y) such that it characterizes a rejected classification.

Figure 2:
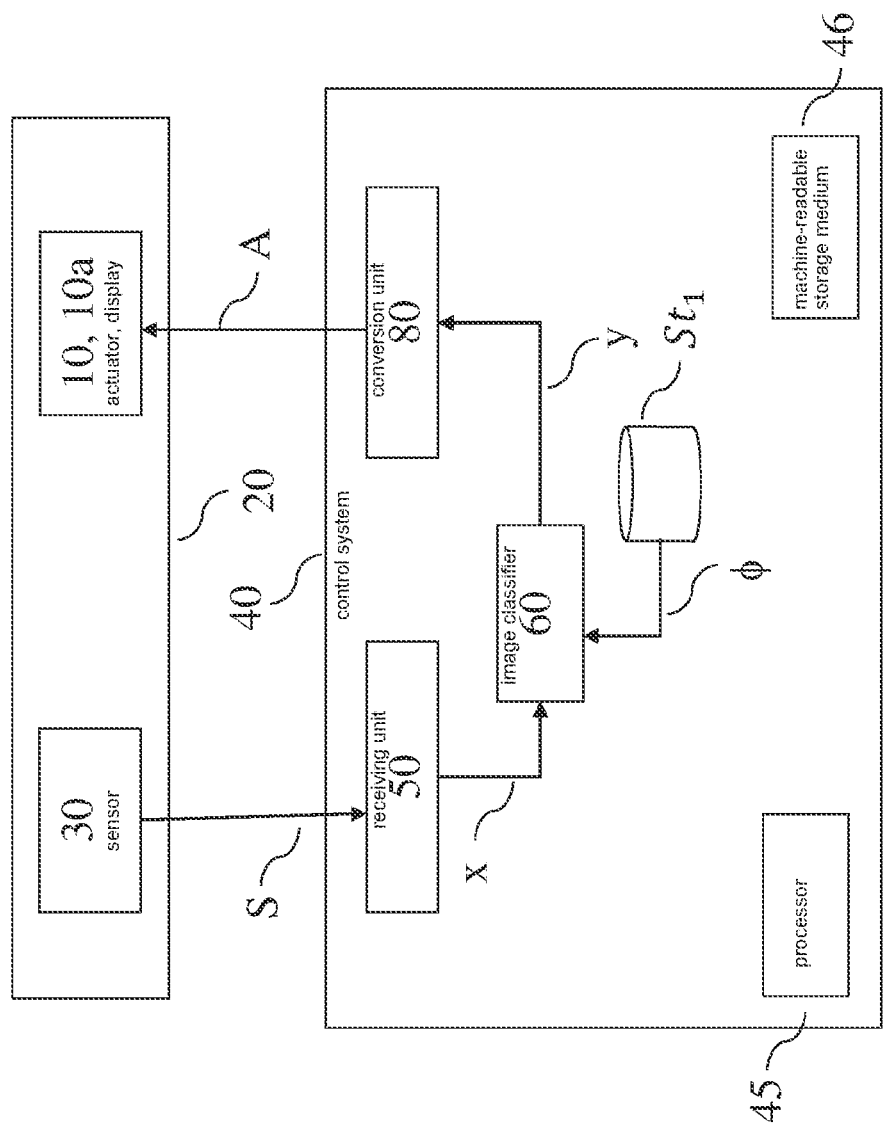
FIG. 2 shows a control system comprising the image classifier controlling an actuator in its environment, according to an example embodiment of the present invention.

Shown in FIG. 2 is an embodiment of an actuator (10) in its environment (20). The actuator (10) interacts with a control system (40). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of actuator control commands (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input images (x). Alternatively, in case of no receiving unit (50), each sensor signal (S) may directly be taken as an input image (x). The input image (x) may, for example, be given as an excerpt from the sensor signal (S). Alternatively, the sensor signal (S) may be processed to yield the input image (x). The input image (x) comprises image data corresponding to an image recorded by the sensor (30). In other words, the input image (x) is provided in accordance with the sensor signal (S).

The input image (x) is then passed on to the image classifier (60).

The image classifier (60) is parametrized by parameters (☐☐, which are stored in and provided by a parameter storage ($St_1$).

The image classifier (60) determines an output signal (y) from the input images (x). The output signal (y) comprises information that assigns one or more labels to the input image (x). The output signal (y) is transmitted to an optional conversion unit (80), which converts the output signal (y) into the control commands (A). The actuator control commands (A) are then transmitted to the actuator (10) for controlling the actuator (10) accordingly. Alternatively, the output signal (y) may directly be taken as actuator control commands (A).

The actuator (10) receives actuator control commands (A), is controlled accordingly and carries out an action corresponding to the actuator control commands (A). The actuator (10) may comprise a control logic which transforms an actuator control command (A) into a further control command, which is then used to control actuator (10).

In further embodiments, the control system (40) may comprise a sensor (30). In even further embodiments, the control system (40) alternatively or additionally may comprise an actuator (10).

In further embodiments, it can be envisioned that the control system (40) controls a display (10a) instead of or in addition to the actuator (10). The display may, for example, display the classification characterized by the output signal (y) and/or whether the classification is robust.

Furthermore, the control system (40) may comprise a processor (45) (or a plurality of processors) and at least one machine-readable storage medium (46) on which instructions are stored which, if carried out, cause the control system (40) to carry out a method according to one aspect of the invention.

Figure 3:
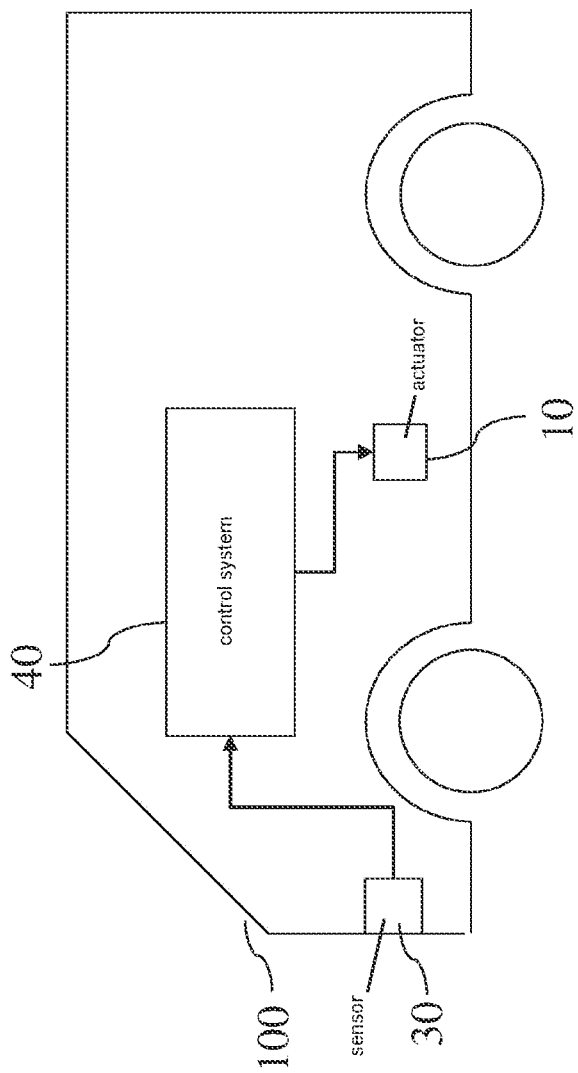
FIG. 3 shows the control system controlling an at least partially autonomous robot, according to an example embodiment of the present invention.

FIG. 3 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors and or one or more position sensors (like e.g. GPS). Some or all of these sensors are preferably but not necessarily integrated in the vehicle (100).

Alternatively or additionally, the sensor (30) may comprise an information system for determining a state of the actuator system. One example for such an information system is a weather information system which determines a present or future state of the weather in the environment (20).

The image classifier (60) may be configured to identify whether the vehicle is currently located in an urban environment, a rural environment or on a highway in order to decide whether an automatic operation of the vehicle should be allowed. For example, it can be imagined that automatic operation of the vehicle is only allowed if the vehicle is located on a highway. It can be further imagined that the automatic operation is only enabled if besides a classification of the environment as "on a highway" the output signal (y) of the image classifier (60) also indicates a robust classification, i.e., a classification that cannot be altered by an adversarial patch.

The actuator (10), which is preferably integrated in the vehicle (100), may be given by a brake, a propulsion system, an engine, a drivetrain, or a steering of the vehicle 100. Actuator control commands (A) may be determined such that the actuator (or actuators) (10) is/are controlled such that vehicle (100) avoids collisions with the detected objects. The detected objects may also be classified according to what the classifier (60) deems them most likely to be, e.g., pedestrians or trees, and the actuator control commands (A) may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the actuator command control (A) may be determined such that propulsion unit and/or steering and/or brake of the mobile robot are controlled such that the mobile robot may avoid collisions with said identified objects.

Figure 4:
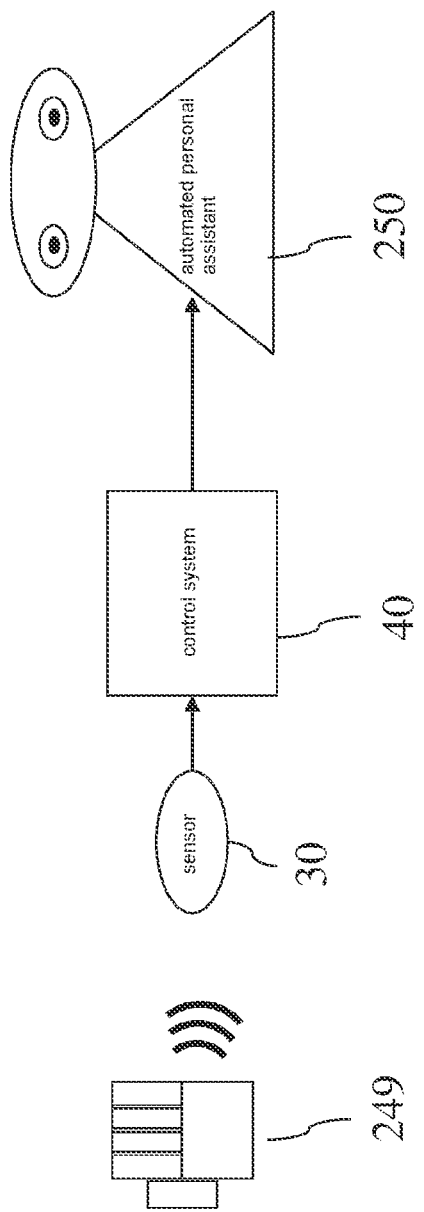
FIG. 4 shows the control system controlling an automated personal assistant, according to an example embodiment of the present invention.

Shown in FIG. 4 is an embodiment in which the control system (40) is used for controlling an automated personal assistant (250). The sensor (30) may be an optic sensor, e.g., for receiving video images of a gestures of a user (249). Alternatively, the sensor (30) may also be an audio sensor, e.g., for receiving a voice command of the user (249).

The control system (40) then determines actuator control commands (A) for controlling the automated personal assistant (250). The actuator control commands (A) are determined in accordance with the sensor signal (S) of the sensor (30). The sensor signal (S) is transmitted to the control system (40). For example, the image classifier (60) may be configured to, e.g., carry out a gesture recognition based on at least one image of the user (249). The control system (40) may then determine an actuator control command (A) for transmission to the automated personal assistant (250). It then transmits the actuator control command (A) to the automated personal assistant (250).

For example, the actuator control command (A) may be determined in accordance with the identified user gesture recognized by the image classifier (60). It may comprise information that causes the automated personal assistant (250) to retrieve information from a database and output this retrieved information in a form suitable for reception by the user (249).

In further embodiments, it may be envisioned that instead of the automated personal assistant (250), the control system (40) controls a domestic appliance (not shown) controlled in accordance with the identified user gesture. The domestic appliance may be a washing machine, a stove, an oven, a microwave or a dishwasher.

Figure 5:
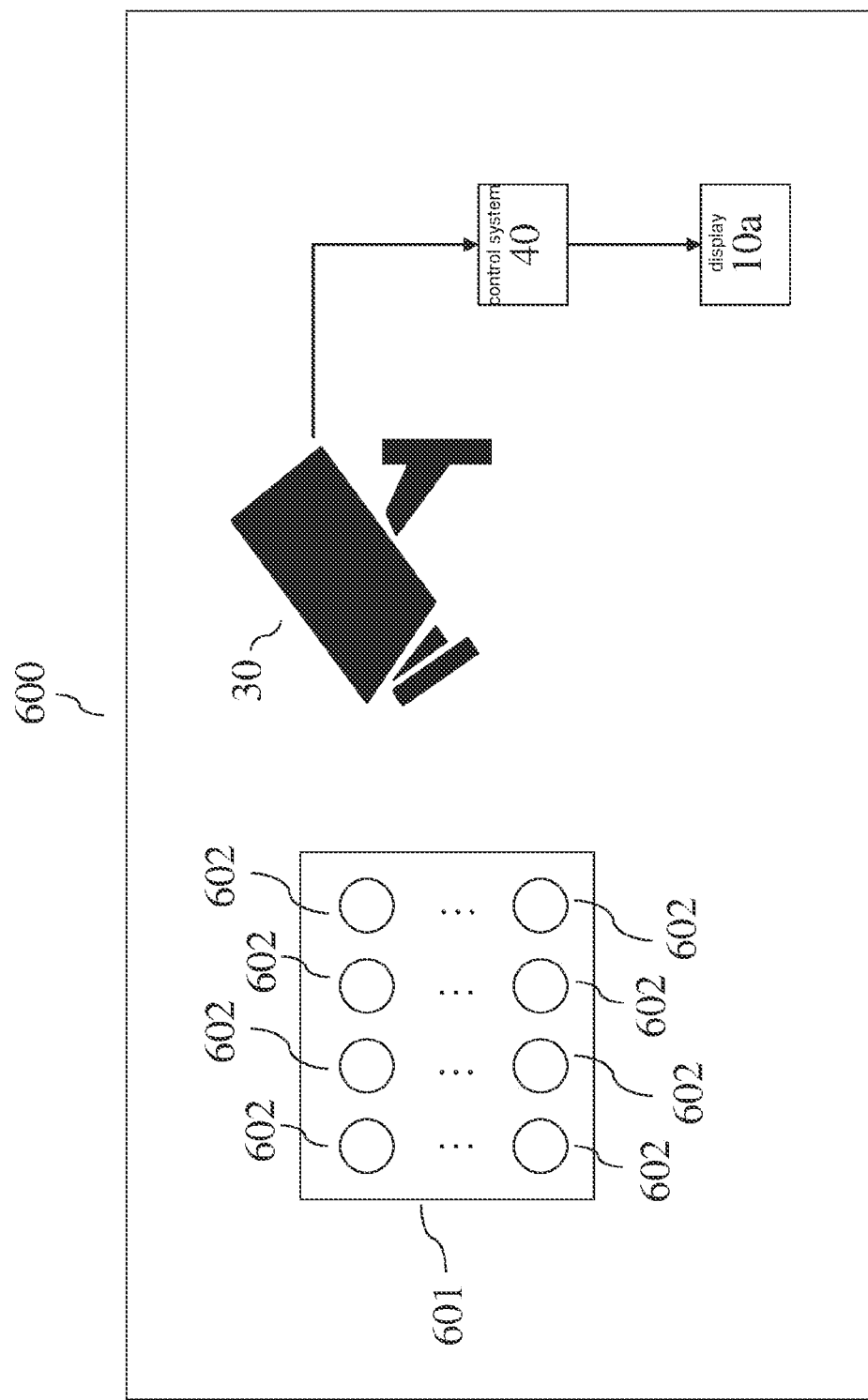
FIG. 5 shows the control system controlling a medical analysis system, according to an example embodiment of the present invention.

Shown in FIG. 5 is an embodiment of a medical analysis system (600) being controlled by the control system (40). The medical analysis system (600) is supplied with a microarray (601), wherein the microarray comprises a plurality of spots (602, also known as features) which have been exposed to a medical specimen. The medical specimen may, for example, be a human specimen or an animal specimen, e.g., obtained from a swab.

The microarray (601) may be a DNA microarray or a protein microarray.

The sensor (30) is configured to sense the microarray (601). The sensor (30) is preferably an optical sensor such as a video sensor.

The image classifier (60) is configured to classify a result of the specimen based on an input image (x) of the microarray supplied by the sensor (30). In particular, the image classifier (60) may be configured to determine whether the microarray (601) indicates the presence of a virus in the specimen.

The control signal (A) may then be chosen such that the display (10a) shows the result of the classification.

Figure 6:
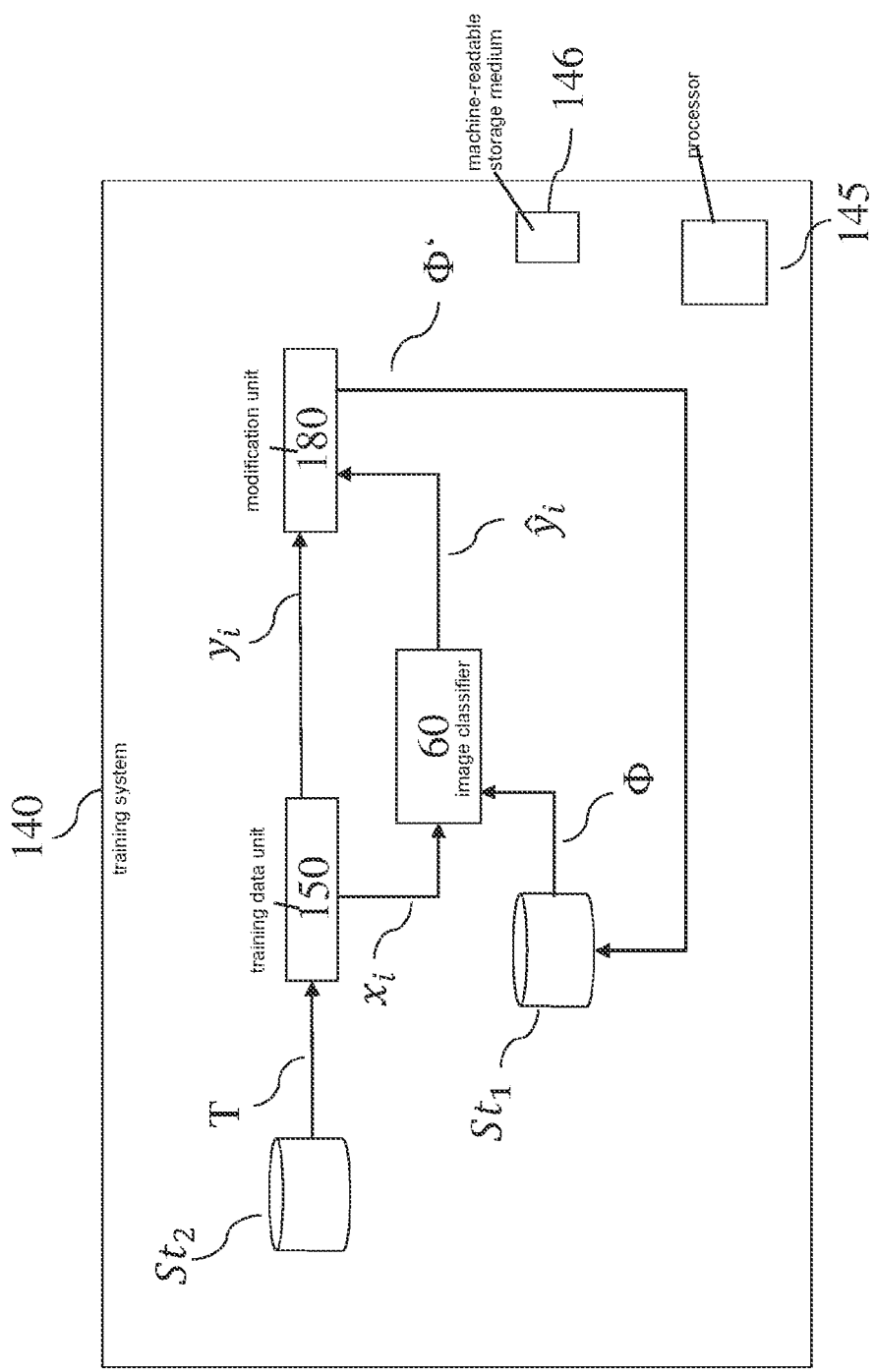
FIG. 6 shows a training system for training the image classifier, according to an example embodiment of the present invention.

FIG. 6 shows an embodiment of a training system (140) for training the image classifier (60) of the control system (40) by means of a training data set (T). The training data set (T) comprises a plurality of input images ($x_i$) which are used for training the classifier (60), wherein the training data set (T) further comprises, for each input image ($x_i$), a desired output signal ($y_i$), which corresponds to the input image ($x_i$) and characterizes a desired classification of the input image ($x_i$).

For training, a training data unit (150) accesses a computer-implemented database ($St_2$), the database ($St_2$) providing the training data set (T). The training data unit (150) determines from the training data set (T) preferably randomly at least one input image ($x_i$) and the desired output signal ($y_i$) corresponding to the input image ($x_i$) and transmits the input image ($x_i$) to the image classifier (60). The image classifier (60) determines an output signal ($\hat{y}_i$) based on the input image ($x_i$) comprising at least a plurality of first class scores obtained for the input image ($x_i$).

The desired output signal ($y_i$) and the determined output signal ($\hat{y}_i$) are transmitted to a modification unit (180).

Based on the desired output signal ($y_i$) and the determined output signal ($\hat{y}_i$), the modification unit (180) then determines new parameters ($\Phi'$) for the image classifier (60). For this purpose, the modification unit (180) compares the desired output signal ($y_i$) and the determined output signal ($\hat{y}_i$) using a loss function. The loss function determines a first loss value that characterizes how far the determined output signal ($\hat{y}_i$) deviates from the desired output signal ($y_i$). In the given embodiment, a margin loss $$l = \max_{c \neq c_t} \max(0, \hat{y}_c + m - \hat{y}_{c_t}),$$

is used as loss function, wherein $\hat{y}_c$ is the c-th class score of the plurality of first class scores determined from the image classifier (60), m is a value characterizing a predefined margin and $\hat{y}_{c_t}$ is the first class score for a desired class of the training image ($x_i$).

In further embodiments, other loss functions may be used, especially conventional loss functions for multiclass classification, e.g., multinomial cross entropy loss.

The modification unit (180) determines the new parameters ($\Phi'$) based on the first loss value. In the given embodiment, this is done using a gradient descent method, preferably stochastic gradient descent, Adam, or AdamW. If the image classifier (60) comprises a Heaviside function, the gradient of the Heaviside function is replaced with the gradient of a sigmoid function.

In other preferred embodiments, the described training is repeated iteratively for a predefined number of iteration steps or repeated iteratively until the first loss value falls below a predefined threshold value. Alternatively or additionally, it is also possible that the training is terminated when an average first loss value with respect to a test or validation data set falls below a predefined threshold value. In at least one of the iterations the new parameters ($\Phi'$) determined in a previous iteration are used as parameters ($\Phi$) of the classifier (60).

In this embodiment, the parameters ($\Phi$) of the image classifier (60) to be updated are the trainable parameters of the convolutional neural network of the image classifier (60). In further embodiments, the image classifier (60) may comprise a second convolutional neural network whose parameters may also belong to the parameters to be updated of the image classifier (60), either in addition or alternatively to the parameters of the convolutional neural network.

Furthermore, the training system (140) may comprise at least one processor (145) and at least one machine-readable storage medium (146) containing instructions which, when executed by the processor (145), cause the training system (140) to execute a training method according to one of the aspects of the invention.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality has N elements, wherein N is the number of elements in the plurality, the elements are assigned the integers from 1 to N. It may also be understood that elements of the plurality can be accessed by their index.

The invention claimed is:

1. A computer-implemented method for determining an output signal characterizing a first classification of an input image into a class from a plurality of classes, wherein the output signal further characterizes a second classification of a robustness of the first classification against an attack with an adversarial patch, wherein the method comprises the following steps:

determining a plurality of first score maps;

determining a plurality of first class scores, wherein each respective first score map of the first score maps corresponds:

to a respective class from the plurality of classes and includes a plurality of area classifications, wherein each of the area classifications characterizes for a respective area of a plurality of areas of the input image whether the respective area belongs to the respective class or not; and to a respective first class score of the plurality of first class scores, which respective first class score is determined by aggregating the area classifications of the respective first score map to which the respective first class score corresponds;

determining a second class score, wherein the second class score is a minimum class score that can be obtained when an adversarial patch is applied to the input image for changing the area classifications of whichever of the first score maps corresponds to a first one of the plurality of classes for which a largest of the first class scores has been determined;

determining a plurality of third class scores, wherein each of the third class scores corresponds to a respective different class, which is different from the first one of the plurality of classes and is a maximum class score that can be obtained when the adversarial patch is applied to the input image for changing the area classifications of the first score map of the respective different class; and determining the output signal based on the second class score and the third class scores according to conditions that:

when the second class score is larger than or equal to all of the third class scores, the output signal characterizes the second classification of the first classification as robust against the adversarial patch; and when the second class score is smaller than at least one of the third class scores, the output signal characterizes the second classification of the first classification as not robust against the adversarial patch.

2. The method according to claim 1, wherein, for each of the respective first class scores, the aggregating is achieved by determining a sum of the area classifications of the respective score map to which the respective first class score corresponds.

3. The method according to claim 2, wherein, for each of the respective first class scores, the aggregating is achieved by a neural network that:

is configured to accept as input the respective score map to which the respective first class score corresponds and provide the respective first class score as output; and includes only positive weights and non-decreasing activation functions.

4. The method according to claim 3, further comprising: training the neural network, wherein the training of the neural network is achieved by adversarial training.

5. The method according to claim 2, wherein in the step of determining the second class score, the second class score is determined by subtracting a maximum amount of area classifications the adversarial patch can change from the largest first class score.

6. The method according to claim 2, wherein in the step of determining the plurality of third class scores, a third class score of the plurality of third class scores is determined by adding a maximum amount of area classifications the adversarial patch can change to a respective first class score.

7. The method according to claim 1, wherein the determining of the second class score includes:

determining a plurality of second score maps for the first one of the plurality of classes, which corresponds to the largest of the first class scores, wherein for each possible position of the adversarial patch in the input image, a respective second score map of the plurality of second score maps is determined, wherein for each of the respective second score maps, a respective area classification of the respective second score map is determined to not characterize the first one of the plurality of classes when the adversarial patch extends into an area corresponding to the respective area classification of the respective second score map;

aggregating each second score map to determine a plurality of intermediate class scores; and providing the smallest intermediate class score from the plurality of intermediate class scores as the second class score.

8. The method according to claim 7, wherein the plurality of first score maps and/or the plurality of second score maps is determined by a convolutional neural network.

9. The method according to claim 8, wherein the convolutional neural network determines each first score map by determining an output of an output layer of the convolutional neural network for the input image and applying a Heaviside function to the output.

10. The method according to claim 8, wherein the method further includes training the convolutional neural network, wherein training includes:

determining a plurality of first training score maps for a training image by providing the training image to the convolutional neural network;

determining a plurality of first training class scores by aggregating each first training score map from the determined plurality of first training score maps;

determining a loss value $$l = \max_{c \neq c_t} \max(0, \hat{y}_c + m - \hat{y}_{c_t}),$$

wherein $\hat{y}_c$ is a c-th class score of the plurality of first training class scores, m is a value characterizing a predefined margin, and $\hat{y}_{c_t}$ is a first training class score of the plurality of first training class scores for a desired class of the training image;

determining a gradient for a plurality of parameters of the convolutional neural network using backpropagation, wherein the convolutional neural network includes a Heaviside function and a gradient of the Heaviside function is replaced by a gradient of a Sigmoid function; and adapting the parameters of the convolutional neural network according to the gradient.

11. The method according to claim 1, wherein in the step of determining the plurality of third class scores, each respective one of the third class scores is determined by:

determining a plurality of second score maps for the respective different class corresponding to the respective third class score, wherein for each possible position of an adversarial patch in the input image a second score map of the plurality of second score maps is determined, wherein for each second score map of the plurality of second score maps a respective area classification is determined to characterize the respective different class if the adversarial patch extends into an area corresponding to the respective area classification;

aggregating each second score map of the plurality of second score maps to determine a plurality of intermediate class scores; and providing a largest intermediate class score from the plurality of intermediate class scores as the respective third class score.

12. The method according to claim 1, wherein a device is controlled in accordance with the output signal.

13. An image classifier comprising:

a processor system that includes at least one processor, wherein the processor system is configured to perform a method to determine an output signal characterizing a first classification of an input image into a class from a plurality of classes, wherein the output signal further characterizes a second classification of a robustness of the first classification against an attack with an adversarial patch, wherein the method includes:

determining a plurality of first score maps;

determining a plurality of first class scores, wherein each respective first score map of the first score maps corresponds:
  to a respective class from the plurality of classes and includes a plurality of area classifications, wherein each of the area classifications characterizes for a respective area of a plurality of areas of the input image whether the respective area belongs to the respective class or not; and
  to a respective first class score of the plurality of first class scores, which respective first class score is determined by the processor system aggregating the area classifications of the respective first score map to which the respective first class score corresponds;

determining a second class score, wherein the second class score is a minimum class score that can be obtained when an adversarial patch is applied to the input image for changing the area classifications of whichever of the first score maps corresponds to a first one of the plurality of classes for which a largest of the first class scores has been determined;

determining a plurality of third class scores, wherein each of the third class scores corresponds to a respective different class, which is different from the first one of the plurality of classes and is a maximum class score that can be obtained when the adversarial patch is applied to the input image for changing the area classifications of the first score map of the respective different class; and determining the output signal based on the second class score and the third class scores according to conditions that:
  when the second class score is being larger than or equal to all of the third class scores, the output signal characterizes the second classification of the first classification as robust against the adversarial patch; and
  when the second class score is being smaller than at least one of the third class scores, the output signal characterizes the second classification of the first classification as not robust against the adversarial patch;

wherein the processor system is configured to perform at least one of the determination of the plurality of first score maps and the determination of the plurality of first class scores by executing a convolutional neural network.

14. A non-transitory machine-readable storage medium on which is stored a computer program that is executable by a processor system and that, when executed by the processor system, causes the processor system to perform a method for determining an output signal characterizing a first classification of an input image into a class from a plurality of classes, wherein the output signal further characterizes a second classification of a robustness of the first classification against an attack with an adversarial patch, the method comprising:

determining a plurality of first score maps;

determining a plurality of first class scores, wherein each respective first score map of the first score maps corresponds:
  to a respective class from the plurality of classes and includes a plurality of area classifications, wherein each of the area classifications characterizes for a respective area of a plurality of areas of the input image whether the respective area belongs to the respective class or not; and
  to a respective first class score of the plurality of first class scores, which respective first class score is determined by aggregating the area classifications of the respective first score map to which the respective first class score corresponds;

determining a second class score, wherein the second class score is a minimum class score that can be obtained when an adversarial patch is applied to the input image for changing the area classifications of whichever of the first score maps corresponds to a first one of the plurality of classes for which a largest of the first class scores has been determined;

determining a plurality of third class scores, wherein each of the third class scores corresponds to a respective different class, which is different from the first one of the plurality of classes and is a maximum class score that can be obtained when the adversarial patch is applied to the input image for changing the area classifications of the first score map of the respective different class; and determining the output signal based on the second class score and the third class scores according to conditions that:
  when the second class score is being larger than or equal to all of the third class scores, the output signal characterizes the second classification of the first classification as robust against the adversarial patch; and
  when the second class score is being smaller than at least one of the third class scores, the output signal characterizes the second classification of the first classification as not robust against the adversarial patch.

* * * * *